(12) United States Patent
Linder

(10) Patent No.: US 6,877,320 B2
(45) Date of Patent: Apr. 12, 2005

(54) TURBINE ARRANGEMENT AND A METHOD OF OPERATING A TURBINE ARRANGEMENT

(75) Inventor: Ulf Linder, Leicester (GB)

(73) Assignee: Alstom Technology LTD, Baden (CH)

(*) Notice: Subject to any disclaimer, the term of this patent is extended or adjusted under 35 U.S.C. 154(b) by 0 days.

(21) Appl. No.: 10/432,529

(22) PCT Filed: Nov. 28, 2001

(86) PCT No.: PCT/SE01/02630
§ 371 (c)(1),
(2), (4) Date: Dec. 18, 2003

(87) PCT Pub. No.: WO02/48509
PCT Pub. Date: Jun. 20, 2002

(65) Prior Publication Data
US 2004/0083736 A1 May 6, 2004

(30) Foreign Application Priority Data
Nov. 29, 2000 (SE) .............................. 0004399

(51) Int. Cl.$^7$ ................................................ F02C 3/30
(52) U.S. Cl. ..................... 60/775; 60/39.182; 60/39.53; 122/7 B
(58) Field of Search ........................ 60/39.182, 39.53, 60/39.55, 775; 122/7 B

(56) References Cited

U.S. PATENT DOCUMENTS

| | | | | |
|---|---|---|---|---|
| 2,678,532 A | * | 5/1954 | Miller | .......................... 60/775 |
| 4,136,643 A | * | 1/1979 | Aguet | .......................... 122/7 B |
| 5,181,376 A | * | 1/1993 | Rao | .............................. 60/775 |
| 5,303,544 A | * | 4/1994 | Kobayashi et al. | ...... 60/39.182 |
| 5,628,183 A | | 5/1997 | Rice | |

FOREIGN PATENT DOCUMENTS

| | | |
|---|---|---|
| EP | 0150990 A2 | 8/1985 |
| EP | 0540787 A1 | 5/1993 |
| EP | 0588392 A1 | 3/1994 |

* cited by examiner

Primary Examiner—Louis J. Casaregola
(74) Attorney, Agent, or Firm—Burns, Doane, Swecker & Mathis, L.L.P.

(57) ABSTRACT

The invention concerns a turbine arrangement comprising a gas turbine unit with a compressor (10), a combustion chamber (12) and a turbine expander (14). The turbine arrangement also has a first unit (20) for heat exchange and steam generation. This first unit (20) receives gas from the turbine expander (14). The first unit (20) comprises a first and a second gas flow path which are at least partly separated from each other. A supplementary combustion unit (32) is arranged to heat the gas in said first gas flow path. Further included is a steam turbine circuit with a steam turbine (30) which is driven with steam generated with the help of the first unit (20). A humidifying device (34) is arranged to add a liquid to a gas from the compressor (10) and a first conduit member (51) conducts humidified gas from the humidifying device (34) to the combustion chamber (12). The first gas conduit member (51) is arranged such that heating of the humidified gas is done with the first unit (20). The invention also concerns a method of operating a gas turbine arrangement.

19 Claims, 3 Drawing Sheets

TURBINE ARRANGEMENT AND A METHOD OF OPERATING A TURBINE ARRANGEMENT

FIELD OF THE INVENTION

The present invention concerns a turbine arrangement comprising at least: a gas turbine arrangement comprising a compressor, a combustion chamber which receives compressed gas from the compressor and a turbine expander which receives gas from the combustion chamber, a first unit for heat exchange and steam generation, comprising a first upstream positioned end which receives gas from said gas turbine expander and a second downstream positioned end from which gas which has passed the first unit is conducted away, wherein said first unit comprises a first and a second gas flow path which are at least partly separated from each other, a steam turbine circuit comprising a steam turbine arranged to be driven by steam generated with the help of said first unit, and a supplementary combustion unit arranged to heat the gas in said first gas flow path.

The invention also concerns a method of operating a turbine arrangement.

BACKGROUND OF THE INVENTION

The turbine arrangement according to the above thus comprises both a gas turbine unit and a steam turbine. Such a turbine arrangement is often called "Combined cycle" (CC). Since the above-mentioned first unit has two gas flow paths, it is often called a "split stream boiler" (SSB).

Different kinds of CC turbine arrangements have been suggested in order to achieve a high efficiency of the arrangement. In order to achieve a high efficiency in the steam cycle, the temperature of the gas from the gas turbine unit, which gas is used to heat the steam in the steam cycle, ought to be as high as possible. This may be achieved by having a high combustion temperature in the combustion chamber from which gas is supplied to the gas turbine expander. However, such a high combustion temperature leads to certain disadvantages. Such disadvantages are for example that the formation of undesired nitrogen oxides may increase, that improved cooling of the gas turbine expander is needed, that maintenance costs increase or that the useful life is reduced.

A known manner of increasing the temperature of the gas from the gas turbine expander is to arrange a supplementary combustion unit after the gas turbine expander in order to heat the gas which is used for heating steam in the steam cycle. It is also known that such a supplementary combustion unit may be arranged in only a part of the gas flow path, i.e. an SSB is used. U.S. Pat. No. 5,628,183 describes different kinds of turbine arrangements of the kind which has been described in the first paragraph above. The document describes how an improved efficiency may be achieved by using an SSB in a CC turbine arrangement.

SUMMARY OF THE INVENTION

The purpose of the present invention is to further increase the inefficiency of a CC turbine arrangement. Another purpose is to achieve this with relatively uncomplicated means.

These purposes are achieved by a turbine arrangement of the kind which has been described in the first paragraph above and which is characterised by a humidifying device arranged to add a liquid to a gas from said compressor, and a first conduit member arranged to conduct humidified gas from the humidifying device to said combustion chamber, wherein the first conduit member is arranged such that heating of the first conduit member and thereby of the humidified gas is done with said first unit.

By adding a liquid to at least a part of the compressed gas and by heating the humidified gas and conducting the same to the combustion chamber, a higher efficiency is obtained in such a CC with SSB.

It should be noted that the gas which is conducted to the compressor of the gas turbine unit preferably consists of air and that in said humidifying device preferably water is added. Other gas or water mixtures are however also possible.

It should also be noted that it is as such known to conduct water steam to a combustion chamber of a gas turbine unit. However, according to the present invention said SSB is used for heating the humidified gas. At the same time the supplementary combustion unit may be used for increasing the temperature in the steam cycle, which means that a high efficiency may be obtained in the steam cycle.

A preferred embodiment of the invention is clear from claim 2. This embodiment has the advantage that the SSB may be used for heating the water that is added to the compressed air. Preferably the low temperature part of the SSB is here used. The energy present in this low temperature part may thereby be used in an advantageous manner.

Another preferred embodiment of the invention is clear from claim 3. Through this embodiment, the water may be heated in two steps. This increases the efficiency of the circuit where air is humidified and conducted to the combustion chamber.

A further preferred embodiment of the invention is clear from claim 4. Through this construction with the supplementary combustion unit arranged upstream of the superheater unit, a high temperature may be achieved in the superheater unit, which leads to a high efficiency of the steam cycle.

Another preferred embodiment of the invention is clear from claim 5. It is as such known that feedwater may be preheated with the help of steam which has been drained off from the steam turbine. However, a particularly advantageously efficiency is achieved if this application is used in a gas turbine arrangement according to the present invention.

Another preferred embodiment of the invention is clear from claim 6. Through this embodiment preferably the low temperature range in the first unit is used. The energy in this low temperature range is hereby utilised in an efficient manner.

Another preferred embodiment of the invention is clear from claim 7. The sixth conduit member may constitute a so-called economiser. The feedwater is hereby heated further before it is conducted to the boiler unit.

A further preferred embodiment of the invention is clear from claim 8. The first conduit portion is thus arranged in the high temperature part of the first unit. Hereby, the humidified air which is conducted back to the combustion chamber may be superheated. This leads to an efficient use in the combustion chamber. Furthermore, this conduit portion means that the temperature of the gas from the turbine expander is somewhat lowered before it reaches the above mentioned supplementary combustion unit. More energy may thereby be supplied via the supplementary combustion unit in such a manner that an optimal high temperature is achieved in the conduit member which conducts steam to the steam turbine.

Another preferred embodiment of the invention is clear from claim 9. Through this embodiment the energy in the gas in the first unit downstream of the boiler unit is utilised in an efficient manner.

Another preferred embodiment of the invention is clear from claim 10. A suitable temperature of the air is hereby achieved before it is conducted to the humidifying device.

Still another preferred embodiment of the invention is clear from claim 11. The cooling of the air leads to a heating of said liquid. This means that this liquid, preferably water, obtains a suitable temperature before it is supplied to the humidifying device.

Another preferred embodiment of the invention is clear from claim 12. Hereby, the gas/steam that is formed with the help of the humidifying device may also be used for cooling the turbine expander. According to a preferred embodiment, the supplied water is in the vapour phase. Since the water is in vapour phase, a better cooling is achieved in the turbine expander.

The purpose of the invention is also achieved by a method of operating a turbine arrangement comprising at least: a gas turbine unit comprising a compressor, a combustion chamber and a turbine expander, a first unit for heat exchange and steam generation, comprising a first upstream positioned end and a second downstream positioned end, wherein said first unit comprises a first and a second gas flow path which are at least partly separated from each other, a steam turbine circuit comprising a steam turbine, and a supplementary combustion unit arranged for heating in said first gas flow path, wherein the method comprises the following steps:

to conduct gas from the compressor to the combustion chamber, to conduct combusted gas from the combustion chamber to the turbine expander, to conduct gas from the turbine expander to said upstream positioned end of the first unit such that combusted gas is conducted through the first unit and at least partly leaves the first unit via said second end, that the steam turbine is driven by steam generated with the help of said first unit, that said supplementary combustion unit heats the gas in said first gas flow path, characterised in that a humidifying device is arranged and used to add a liquid to a gas which is conducted to the humidifying device from said compressor, and that humidified gas from the humidifying device is conducted to said combustion chamber via the first unit such that the humidified gas is heated in said first unit.

According to this method the advantages which have been described above in connection with the turbine arrangement are achieved. Advantageous manners of carrying out the method according to the invention are clear from the claims 14 to 19. With these manners, corresponding advantages as in the different above described embodiments of the turbine arrangement are achieved.

DETAILED DESCRIPTION OF THE INVENTION

Figure 1:
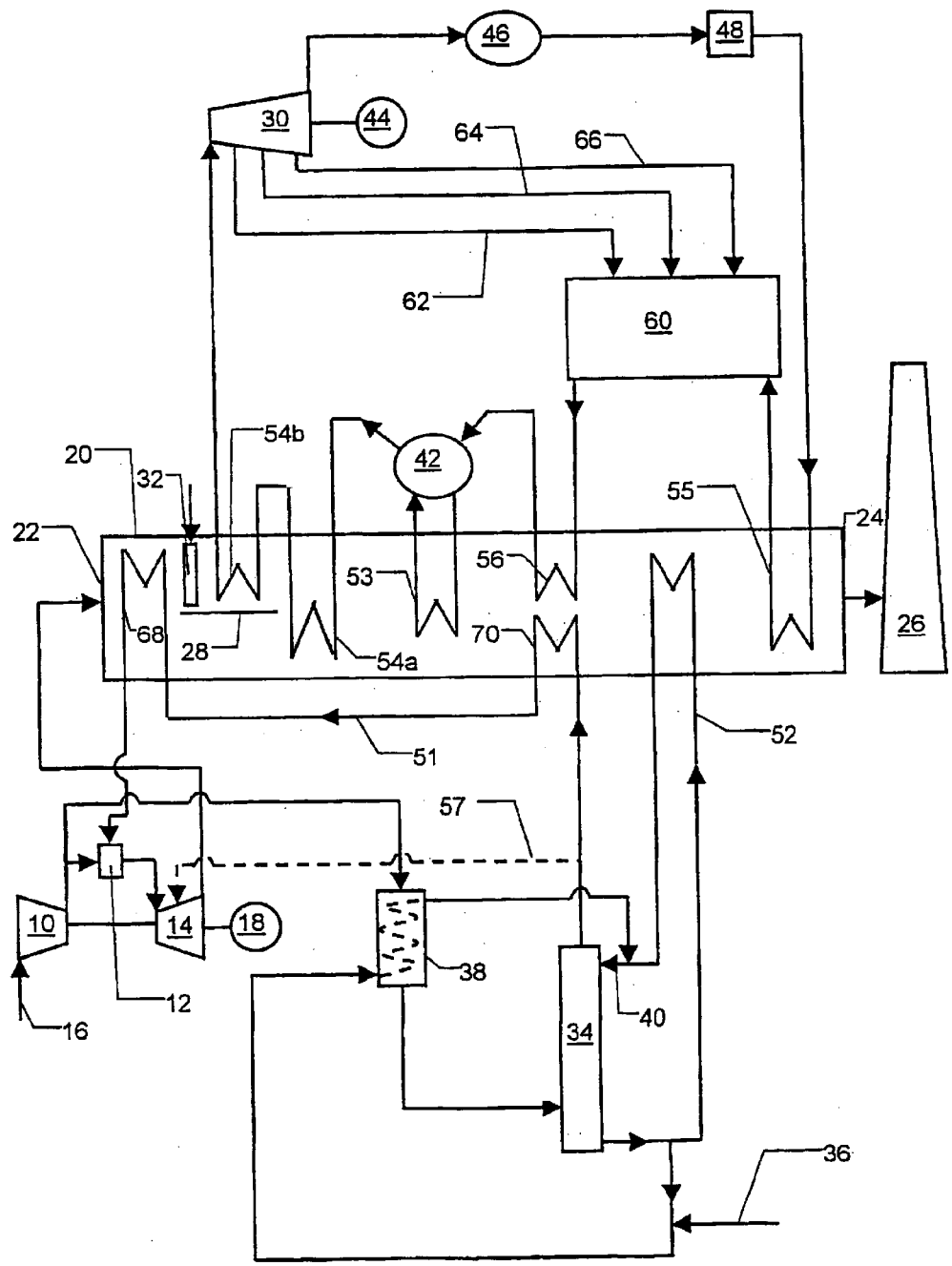
FIG. 1 shows schematically an embodiment of the invention.

FIG. 1 shows schematically a turbine arrangement according to an embodiment of the invention. The turbine arrangement comprises a gas turbine unit with a compressor 10, a combustion chamber 12 and a turbine expander 14. The compressor 10 is fed with a combustion medium, preferably air, via an inlet 16. Compressed air is conducted to and combusted in the combustion chamber 12. The combustion chamber also has an inlet (not shown in the figure) for the supply of a fuel. Combusted gas from the combustion chamber 12 drives the turbine expander 14. The compressor 10 and the turbine expander 14 are suitably arranged on a common axle. The gas turbine unit may for example drive a generator 16 for producing electric energy. Combusted gas from the turbine expander 14 is conducted to a first unit 20 for heat exchange and steam generation. The first unit 20 has an upstream positioned end 22 which receives gas from the turbine expander 14. The first unit 20 also has a second downstream positioned end 24 from which gas which has passed the first unit 20 is conducted away, for example via a stack 26. The first unit 20 has a first gas flow path (in the upper part in the figure) and a second, gas flow path (in the lower part in the figure). The first and the second gas flow paths are at least partly separated from each other. This separation is symbolised with a wall 26. Such a first unit 20 may, as has been explained above, be called an SSB. Examples of embodiments of such SSB are for example included in the above mentioned U.S. Pat. No. 5,628,183. In this document also advantages with such an SSB are described.

The turbine arrangement comprises a steam turbine circuit with a steam turbine 30 which is driven with steam generated by the first unit 20. The turbine arrangement comprises a supplementary combustion unit 32 which heats the gas in the first gas flow path.

In the gas turbine circuit some compressed air from the compressor 10 is conducted to a humidifying device 34. In the humidifying device 34 water is added to the air from the compressor 10. The water may be supplied via a supplied conduit 36. The gas from the compressor 10 which is conducted to the humidifying device 34 is cooled with the help of a cooler 38. This cooling is suitably done with the help of the supplied water. The water is thereby heated before it is supplied to the humidifying device 34 via an inlet 40. A first conduit member 51 is arranged to conduct humidified air from the humidifying device 34 to the combustion chamber 12. The first conduit member 51 passes via the first unit 20 such that the humidified air is heated before it is conducted to the combustion chamber 12. A circulation circuit shown as a second conduit member 52 utilises the low temperature heat in the first unit 20. The collected heat is conducted back to the compressor air in the humidifying device 34. This is done in that water from the humidifying device 34 is conducted in the second conduit member 52 via the first unit 20 where heating of this water takes place before it is conducted back to the humidifying device 34.

The steam turbine circuit comprises a boiler unit 42 with a third conduit member 53 which is drawn to the first unit 20 in order to bring water to a boil. From the boiler unit 42 water is conducted via a superheater unit 54 to the steam turbine 30. The superheater unit may for example consist of a first superheater 54a and a second superheater 54b. The supplementary combustion unit 32 is arranged upstream of the superheater unit 54. In this manner, the steam in the superheater unit 54 may be heated to a temperature which is optimal for the steam turbine 30. The steam turbine 30 may suitably drive a generator 44 for producing electric energy. Steam from the steam turbine 30 is condensed in a condenser 46. Water from the condenser 46 passes through a pump 48.

This water may be heated in a fifth conduit member 55 which is drawn through a downstream located portion of the first unit 20. The water is conducted on via a preheating unit 60 to a sixth conduit member 26 which passes through the first unit 20 for further heating the water. The water from the sixth conduit member 56 is conducted to the boiler unit 42.

Steam from different parts of the steam turbine 30 is conducted via conduits 62, 64, 66 to the preheating unit 60. The supplied steam is used for heating the water which reaches the preheating unit 60 via the fifth conduit member 55. The steam which is supplied to the preheating unit 60 via the conduits 62, 64, 66 is suitably added to the water from the fifth conduit member 55.

The first conduit member 51, which conducts air mixed with water steam from the humidifying device 34, may suitably comprise a first conduit portion 68 which is arranged upstream of the supplementary combustion unit 32 and a second conduit portion 70 which is arranged downstream of the third conduit member 53, i.e. downstream of the boiler unit 42.

As is indicated with a hatched line, the turbine arrangement may comprise a seventh conduit member 57 for conducting air mixed with water steam from the humidifying device 34 to the turbine expander 14 for cooling this turbine expander 14.

A method of operating a turbine arrangement is also clear from the description above, which turbine arrangement comprises a gas turbine unit, a first unit 20 for heat exchange and steam generation, a steam turbine circuit and a supplementary combustion unit 32 arranged for heating in a first gas flow path in the first unit 20. According to the method, a gas is conducted from the compressor 10 to the combustion chamber 12. Combusted gas from the combustion chamber 12 is conducted to the turbine expander 14. From the turbine expander 14, a combusted gas is conducted to the upstream positioned end 22 of the first unit 20. Combusted gas leaves the first unit 20 via a second end 24. The steam turbine 30 is driven with steam generated with the help of the first unit 20. The supplementary combustion unit 32 heats the gas in the first gas flow path. A humidifying device 34 is arranged and is used for adding a liquid to the gas from the compressor 10. Humidified gas from the humidifying device 34 is conducted to the combustion chamber 12 via the first unit 20 where the humidified gas is heated.

Further advantageous manners of carrying out the method are clear from the claims 15–19 and from the description above.

Figure 2:
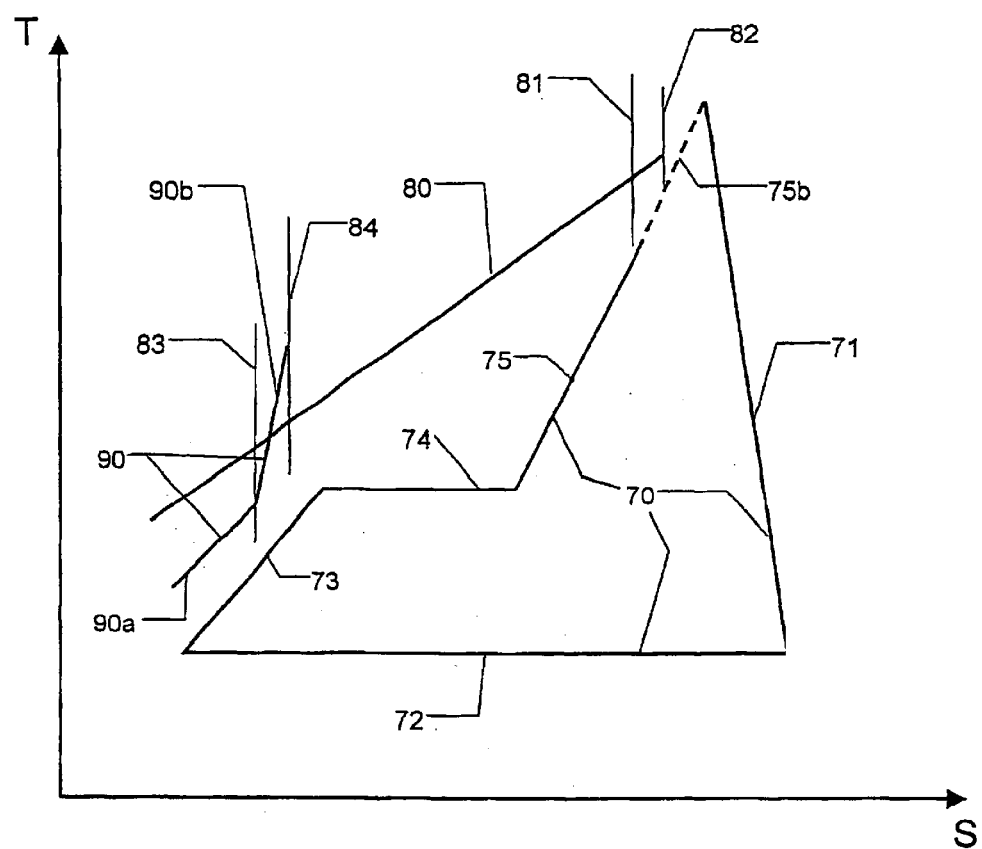
FIG. 2 shows schematically a diagram of the temperature as a function of entropy.

FIG. 2 shows schematically a graphical representation of the temperature T as a function of the entropy S for the turbine arrangement according to the invention. The closed loop 70 represents the steam turbine circuit. 71 represents the expansion phase in the steam turbine 30. 72 represents the condensation of the steam from the steam turbine 30. 73 represents the heating with the help of the fifth conduit member 55, the preheating unit 60 and the sixth conduit member 56. It may be noted that the fifth conduit member 55 and the sixth conduit member 56 may be called economisers. 74 represents the boiling phase in the boiler unit 42 with the third conduit member 53. 75 represents the heating in the superheater unit 54. The hatched line 75b represents here the further heating which is achieved with the help of the supplementary combustion unit 32. With the help of the supplementary combustion unit 32 steam may thus be heated to an optimal high temperature, which contributes to a high efficiency in the steam cycle.

The line 80 represents the exhaust from the turbine expander 14 when the same passes the first unit 20. The upper part of the line 80 thus corresponds to the exhaust at the first end 22 of the first unit 20.

The curve 90 represents the humidified air from the humidifying device 34 to the combustion chamber 12. 90a represents the heating with the help of the second conduit portion 70 of the first conduit member 51. 90b represents the part of the curve 90 where heating takes place with the help of the first conduit portion 68 which is arranged upstream of the supplementary combustion unit 32.

The portion of the line 80 which is located between the strokes 81 and 82 represents the heat in the exhaust from the turbine expander 14 which is used for heating in said first conduit portion 68, i.e. the heat that is supplied to the humidified air in the curve portion 90b between the strokes 83 and 84. Normally, the heat which is consumed for heating in the first conduit portion 68 would lower the temperature of the steam to the steam turbine 30. However, this does not take place in this case since the supplementary combustion unit 32 supplies further heat to the superheater unit 54.

Figure 3:
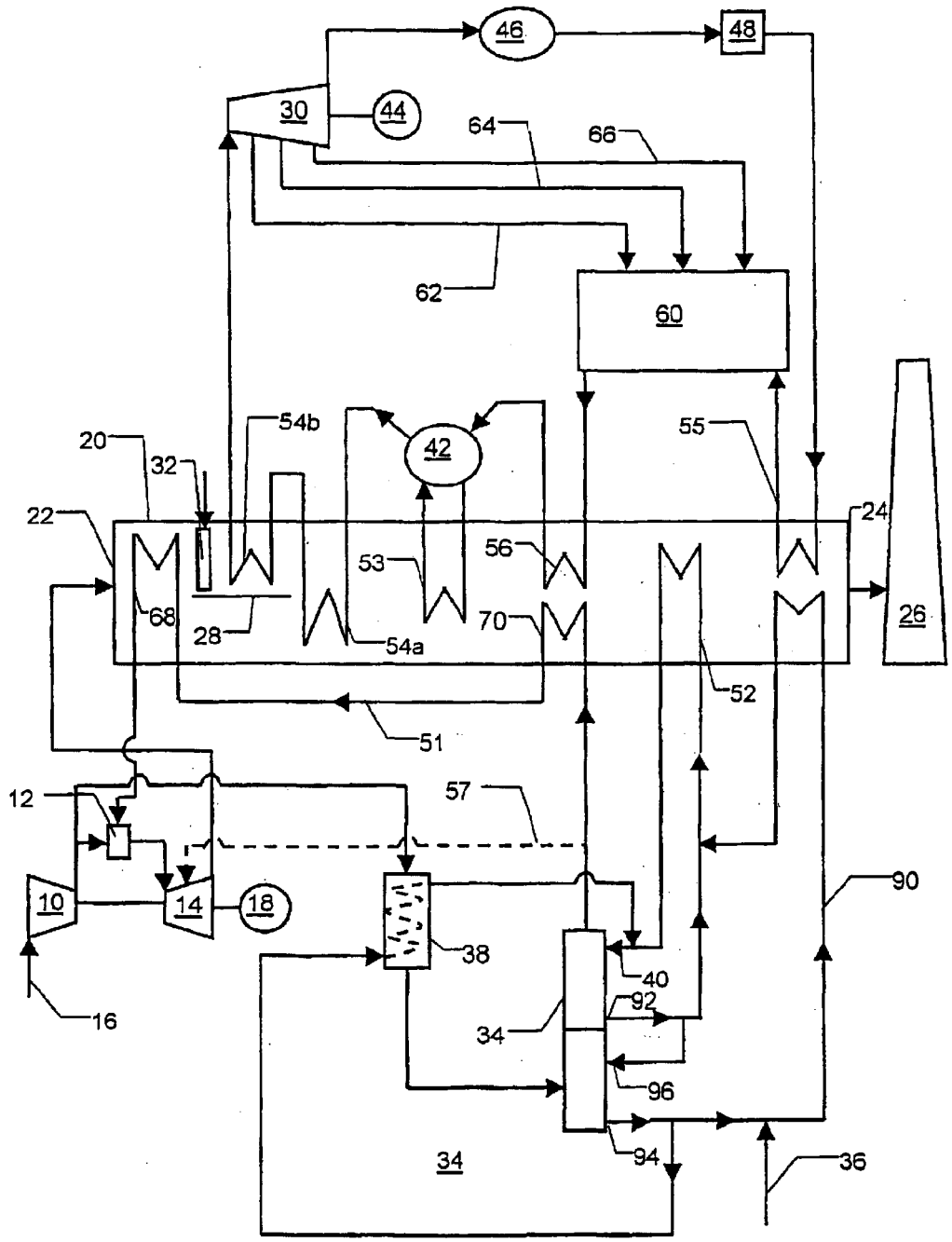
FIG. 3 shows schematically another embodiment of the invention.

FIG. 3 shows schematically another embodiment of the invention. Corresponding parts as in the embodiment according to FIG. 1 have the same reference signs in FIG. 3. These parts will therefore not be described more closely here. FIG. 3 thus shows a further conduit member 90 where water from the humidifying device 34 is conducted via the first unit 20 for heating before this water is supplied to the above mentioned second conduit member 52. The supply of the water is also here represented by a supply conduit 36. According to this embodiment, this supply conduit 36 is connected to the further conduit member 90. The humidifying device 34 may in this case be seen as consisting of an upper and a lower part. The water is thus drained off both in an upper outlet 92 and in a lower outlet 94. The water may also be returned to the lower part of the humidifying device 34 through an inlet 96. With the embodiment according to FIG. 3 an improved efficiency of the lower steam circuit in the turbine arrangement is achieved, i.e. the steam circuit which consists of that water is added to the air from the compressor 10 whereafter heated air/steam is returned to the combustion chamber 12.

It should be noted that preferably the second superheater 54b is arranged to collect heat in only the first gas flow path. The first superheater 54a, as well as the other conduit members/conduit portions 68, 53, 56, 70, 52, 55, 90, are preferably arranged to collect heat in the whole first unit, and thus not only in one of the gas flow paths.

With the present invention a high efficiency is achieved in the steam turbine circuit at the same time as the turbine arrangement as a whole achieves a high efficiency.

It should be noted that further heat exchangers, pumps or other devices known to the person skilled in the art may be used in connection with the turbine arrangement. An advantage with the invention is that the steam turbine circuit is disengaged from the lower steam circuit where water is added to the air from the compressor 10. Within the scope of the invention is however also the possibility that a certain exchange of water or steam takes place between these circuits.

The invention is not limited to the shown embodiments but may be modified and varied within the scope of the appended claims.

What is claimed is:

1. A turbine arrangement comprising at least:
   a gas turbine unit comprising a compressor, a combustion chamber which receives compressed gas from the compressor and a turbine expander which receives gas from the combustion chamber, a first unit for heat exchange and steam generation, comprising a first upstream positioned end which receives gas from said turbine expander and a second downstream positioned end from which gas which has passed the first unit is conducted away, wherein said first unit comprises a first and a second gas flow path which are at least partly separated from each other, a steam turbine circuit comprising a steam turbine arranged to be driven by steam generated with the help of said first unit, a supplementary combustion unit arranged to heat the gas in said first gas flow path, comprising a humidifying device arranged to add a liquid to a gas from said compressor, and a first conduit member arranged to conduct humidified gas from the humidifying device to said combustion chamber, wherein the first conduit member is arranged such that heating of the first conduit member and thereby of the humidified gas is done with said first unit.

2. A turbine arrangement according to claim 1, comprising a second conduit member for conducting a liquid which is added to the gas in the humidifying device, wherein said second conduit member is drawn via said first unit for heating the liquid in this second conduit member.

3. A turbine arrangement according to claim 2, comprising a further conduit member for conducting said liquid which is added to the gas in the humidifying device and for heating the liquid in this further conduit member, wherein said further conduit member is drawn via a position in said first unit which is located downstream of the position in the first unit where said second conduit member is drawn.

4. A turbine arrangement according to claim 1, wherein the steam turbine circuit comprises a boiler unit with a third conduit member which is drawn through said first unit and a superheater unit with a fourth conduit member where steam from the boiler unit is conducted via said first unit and wherein said supplementary combustion unit is located upstream of said fourth conduit member in said first unit.

5. A turbine arrangement according to claim 4, wherein the steam turbine circuit comprises a preheating unit for heating feedwater which is conducted to said boiler unit, wherein said preheating unit is arranged to preheat the feed water with the help of steam from the steam turbine.

6. A turbine arrangement according to claim 5, wherein the steam turbine circuit comprises a fifth conduit member which is drawn through said first unit for heating condensed water from the steam turbine before this water is conducted to said preheating unit.

7. A turbine arrangement according to claim 5, wherein the steam turbine circuit comprises a sixth conduit member which is drawn through said first unit for heating water from said preheating unit before this water is conducted to said boiler unit.

8. A turbine arrangement according to claim 1, wherein said first conduit member comprises a first conduit portion which is arranged upstream of said supplementary combustion unit in said first unit.

9. A turbine arrangement according to claim 4, wherein said first conduit member comprises a second conduit portion which is arranged downstream of said third conduit member in said first unit.

10. A turbine arrangement according to claim 1, comprising a cooling unit with which gas from said compressor is cooled before this gas reaches the humidifying device.

11. A turbine arrangement according to claim 10, wherein said cooling unit is arranged such that cooling takes place therein with the help of a liquid which is supplied to said humidifying device.

12. A turbine arrangement according to claim 1, comprising a seventh conduit member for conducting humid gas from said humidifying device to said turbine expander for cooling the turbine expander.

13. A method of operating a turbine arrangement comprising at least:

a gas turbine unit comprising a compressor, a combustion chamber and a turbine expander, a first unit for heat exchange and steam generation, comprising a first upstream positioned end and a second downstream, positioned end, wherein said first unit comprises a first and a second gas flow path which are at least partly separated from each other, a steam turbine circuit comprising a steam turbine, and a supplementary combustion unit arranged for heating in said first gas flow path, wherein the method comprises the following steps:

to conduct gas from the compressor to the combustion chamber, to conduct combusted gas from the combustion chamber to the turbine expander, to conduct gas from the turbine expander to said upstream positioned end of the first unit such that combusted gas is conducted through the first unit and at least partly leaves the first unit via said second end, that the steam turbine is driven by steam generated with the help of said first unit, that said supplementary combustion unit heats the gas in said first gas flow path, wherein a humidifying device is arranged and used to add a liquid to a gas which is conducted to the humidifying device from said compressor, and that humidified gas from the humidifying device is conducted to said combustion chamber via the first unit such that the humidified gas is heated in said first unit.

14. A method according to claim 13, wherein the liquid which is added to the gas in the humidifying device is first heated with the help of said first unit.

15. A method according to claim 13, wherein in said steam turbine circuit is arranged a boiler unit with a third conduit member which is drawn through said first unit and a superheater unit with a fourth conduit member where steam from the boiler unit is conducted via said first unit, wherein said supplementary combustion unit is arranged upstream of said fourth conduit member in said first unit.

16. A method according to claim 15, wherein a preheating unit is arranged in the steam turbine circuit and wherein with the help of the preheating unit feedwater which is conducted to said boiler unit is preheated with the help of steam from the steam turbine.

17. A method according to claim 16, wherein condensed water from the steam turbine is heated with the help of the first unit before this water is conducted to said preheating unit.

18. A method according to claim 13, wherein humidified gas from the humidifying device for heating is conducted via a position in said first unit which is located upstream of said supplementary combustion unit.

19. A method according to claim 15, wherein humidified gas from the humidifying device for heating is conducted via a position in said first unit which is located downstream of said third circuit member.

* * * * *